United States Patent
Coleman

(10) Patent No.: US 6,345,925 B1
(45) Date of Patent: Feb. 12, 2002

(54) BOLT FOR CONVEYOR BELT FASTENER

(75) Inventor: John Coleman, Scarborough, ME (US)

(73) Assignee: Flexible Steel Lacing Company, Downers Grove, IL (US)

( * ) Notice: Subject to any disclaimer, the term of this patent is extended or adjusted under 35 U.S.C. 154(b) by 0 days.

(21) Appl. No.: 09/394,837

(22) Filed: Sep. 13, 1999

(51) Int. Cl.[7] .................................................. F16G 3/00
(52) U.S. Cl. ...................... 403/24; 403/306; 198/844.2; 24/31 B
(58) Field of Search ................................ 403/306, 312, 403/293, 292, 24, 342; 198/844.2; 24/31 B, 314, 38; 411/386

(56) References Cited

U.S. PATENT DOCUMENTS

| | | | |
|---|---|---|---|
| 3,913,180 A | * 10/1975 | Pray | 24/31 B |
| 4,558,492 A | * 12/1985 | Hite et al. | 24/31 B |
| 4,600,343 A | * 7/1986 | Frerejacques | 411/386 X |
| 4,757,576 A | * 7/1988 | Jaubert | 24/38 |
| 5,374,146 A | 12/1994 | Allen | |
| 5,499,895 A | 3/1996 | Allen | |
| 5,599,131 A | 2/1997 | Julen et al. | |
| 5,896,981 A | * 4/1999 | Walsh et al. | 198/844.2 |
| 6,053,308 A | * 4/2000 | Vogrig et al. | 198/844.2 |
| 6,077,013 A | * 6/2000 | Yamamoto et al. | 411/386 |

* cited by examiner

Primary Examiner—Harry C. Kim
(74) Attorney, Agent, or Firm—Fitch, Even, Tabin & Flannery

(57) ABSTRACT

A fastener is provided for splicing end portions of conveyor belts together with the fastener having a bolt with a pilot or lead-in portion that provides improved threading of a nut thereto and makes installation of the fasteners on the belt ends faster and easier. The pilot of the bolt is longer than the beveled conical tip portion of prior bolts so that nuts received thereon will stay substantially aligned with the axis of the shank. In this manner, threading of the nut to the bolt shank is easier in terms of avoiding cross-threading problems. Also, as the pilot portion of the shank is free of any threads, the installation of the bolt onto the belt ends can be done more quickly with less resistance during the insertion process. With the threading of the nuts started on the bolt shank threads, the nuts are less likely to fall off the piloted shank when a power wrench is used to screw the nuts down for clamping the plates of the fastener about the belt end as even if the nuts become unthreaded from the shank, the pilot portion will hold the nuts thereon. Further, the lead-in portion free of threads provides a protection area for the endmost threads on the shank that are spaced further down the length of the shank.

21 Claims, 8 Drawing Sheets

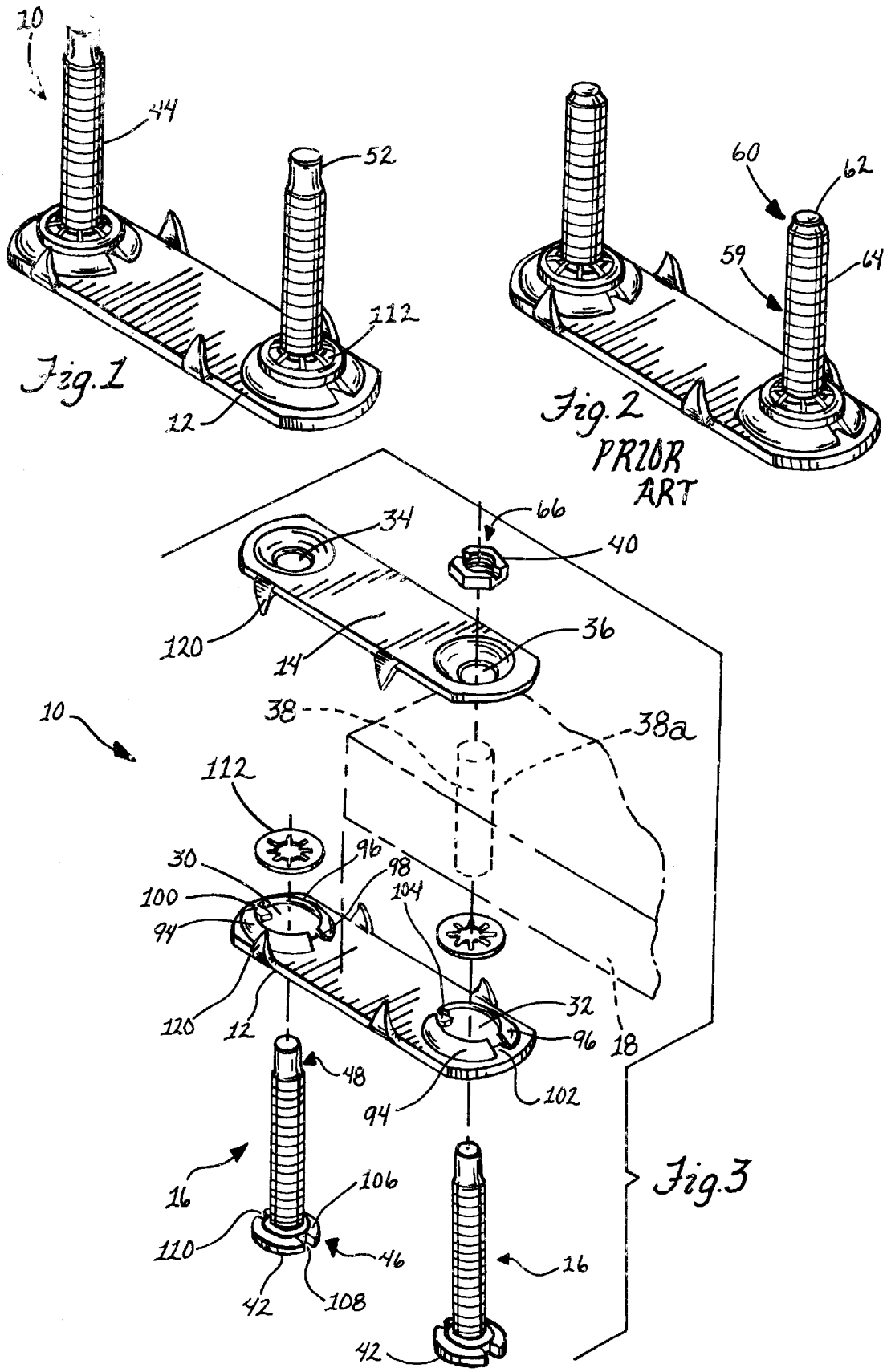

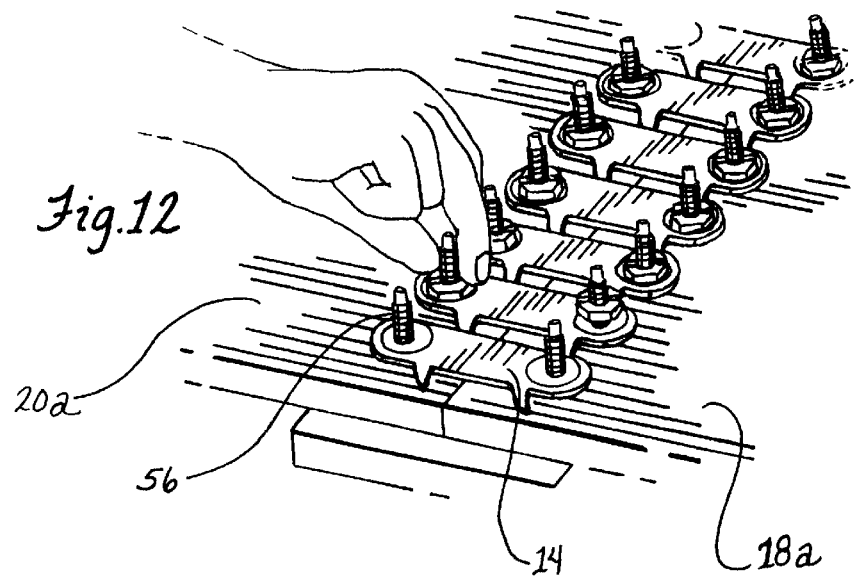
Fig. 12
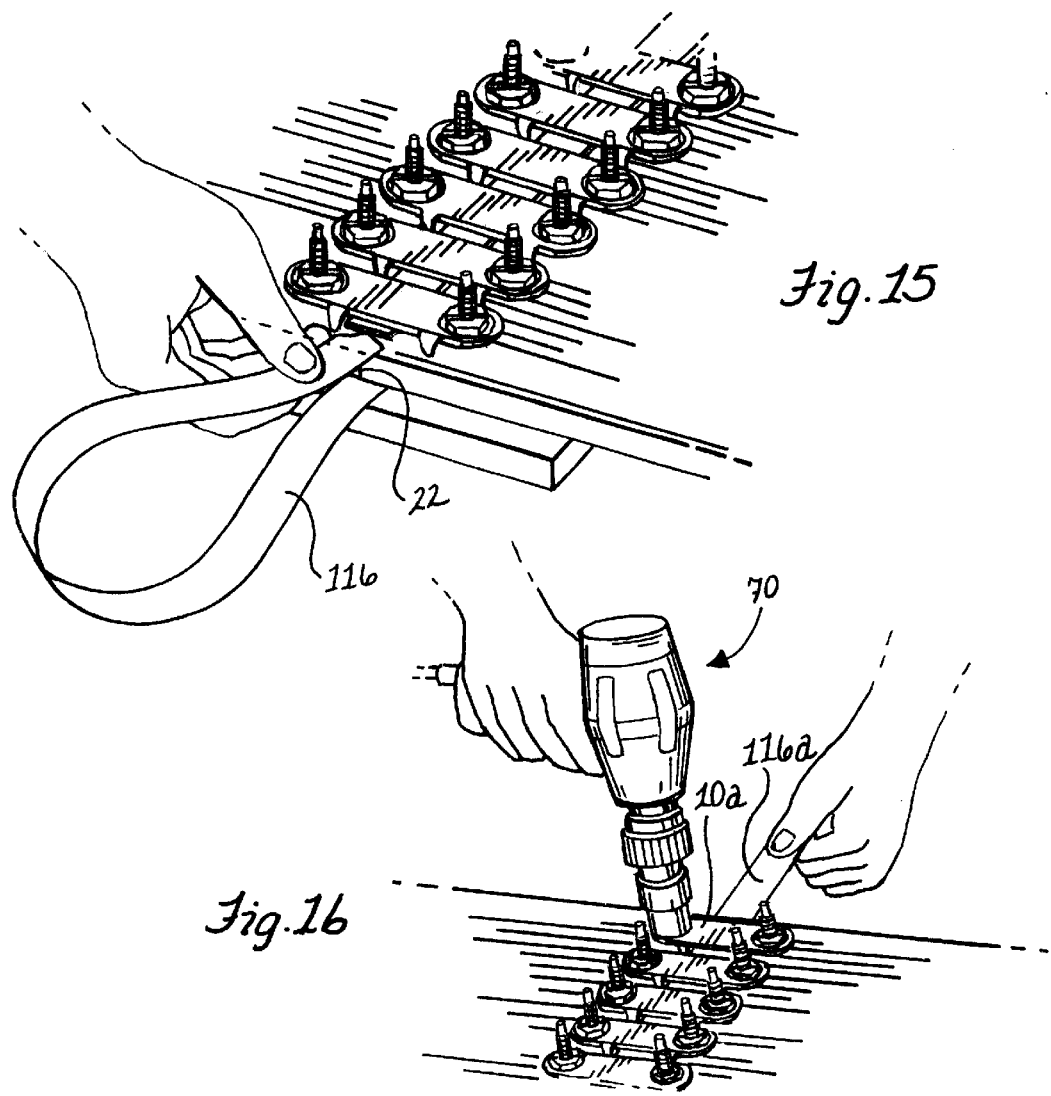
Fig. 15
Fig. 16

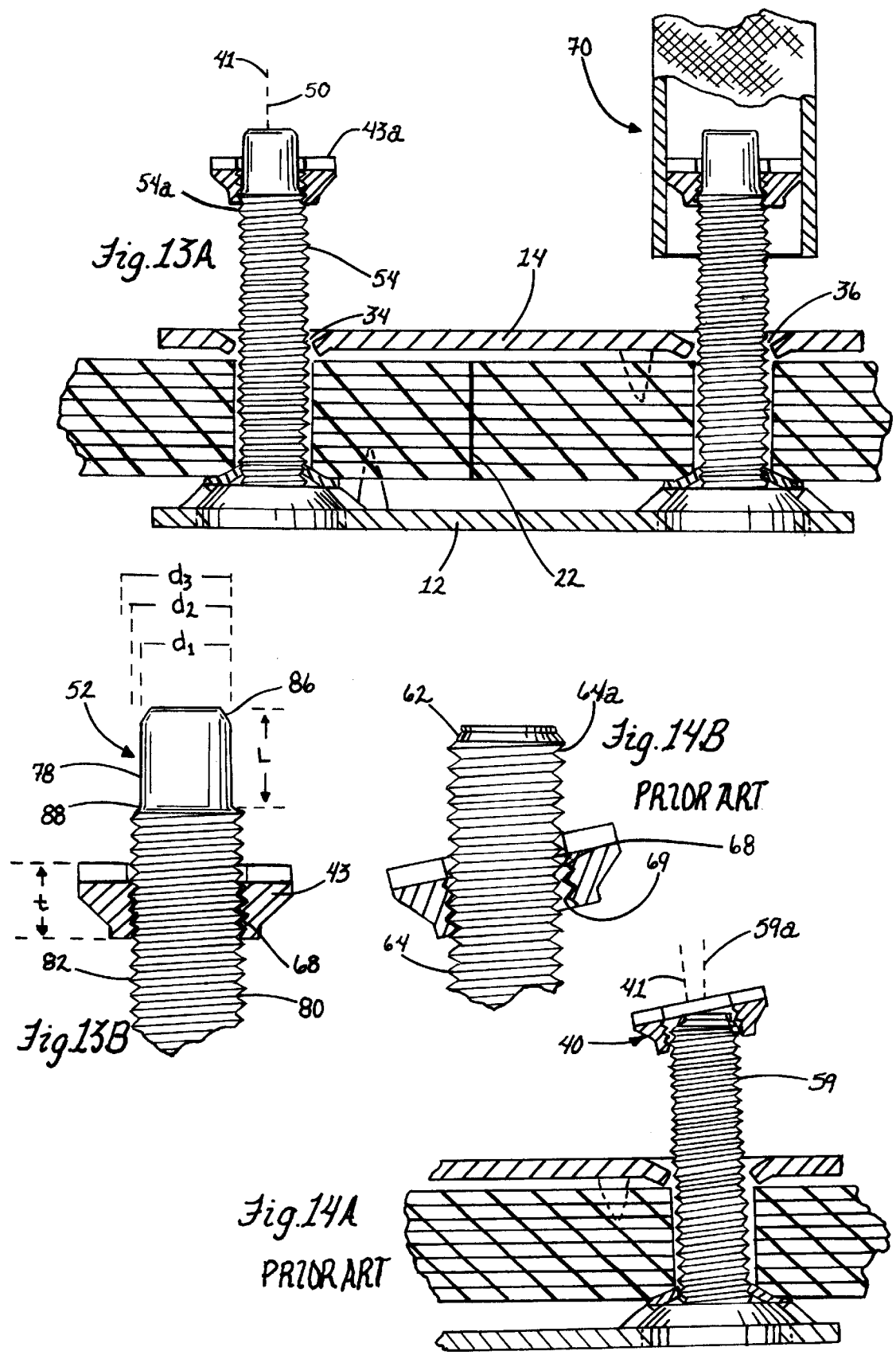

BOLT FOR CONVEYOR BELT FASTENER

FIELD OF THE INVENTION

The invention relates to a bolt for a conveyor belt fastener used in belt splices and, more particularly, to a conveyor belt fastener bolt that allows splices to be applied more easily and quickly and with improved strength.

BACKGROUND OF THE INVENTION

Most belt fasteners used for making belt splices have an upper member or plate and a lower member or plate that are clamped on opposite surfaces at a belt end portion that is to be spliced to another belt portion. Solid plate fasteners utilize a single plate on the upper surface and a single plate on the bottom surface spanning both end portions of the conveyor belt, whereas hinge fasteners have arcuate hinge loops that connect the upper and lower plates and which mate with loops of fasteners attached to the other belt end portion for receiving a hinge pin therethrough to provide a hinged splice. The present invention is directed to a bolt that is used with belt fasteners of either type of the above-described fasteners, i.e. solid plate or hinge fasteners.

Present conveyor belts can have a wide variety of constructions designed according to the rigors of the applications which they must withstand. The mechanical fastener chosen for a conveyor system requires taking into account the tensile strength of the belts employed and the pulley diameters in the conveyor drive system from which the belts are to be run. Conveyor belt materials are typically of a rubber or PVC construction and with various strengthening compounds, include woven materials and/or have plies of different materials running therethrough to improve the belt tensile strength. The covers of conveyor belts particularly in heavy-duty applications will have a tough, rugged construction to provide the necessary durability for the abrasive and heavy materials usually transported thereby.

With the mechanical solid plate or hinged fasteners that use bolts for clamping the plates onto the opposite surfaces of the belt end portions, one of the major considerations is the installation time and the ability of the applied fasteners to provide a good, strong splice. In both the bolt hinged and solid plate fastener systems, a template is used for forming through holes in the belt end portions for receiving the bolts of the fasteners therethrough. The punch or bores are driven as by a power tool through openings in the template into the belt carcass for accurately forming the through holes for proper fastener alignment. Inserting the threaded shanks of the bolts into and through the holes in the belt end portions can be a very difficult and time consuming task. Where the holes in the belt are tightly formed so that there is little loose play between the shank and the belt carcass material about the hole, the shank threads tend to get hung up on the belt carcass as the worker attempts to push the bolts through the holes in the belt. Because these belts are typically of very tough and rugged construction as previously described, this pushing of the bolts through the holes can take a significant amount of time and effort. With the bolt solid plate fasteners, after all bolts are inserted through the first belt end portion there remains the task of placing the holes of the other belt end portion onto the bolts of the fasteners already in place on the first belt end portion. For this purpose, the template has a comb-like edge with notches for receiving the bolts to be inserted in the belt end to help keep them aligned during this process; however, the bolts are still not totally confined and do tend to move around particularly as the worker encounters difficulty as they push the belt down onto the bolts for being inserted through the holes.

After repeated usage, the edges about the guide holes in the templates can become deformed because of engagement with the driven punch distorting the holes from their desired circular shape. Deformed template holes usually lead to inconsistent, ragged through holes formed in the belt end such as with an oval cross-sectional shape. While this provides for easier installation of the bolts through the larger ovalized through holes, there is also a greater amount of belt carcass material removed and more play between the hole walls in the belt end and the shank of the bolt therein. The larger holes and looseness of the fit between the bolts and holes in the belt end produces a weaker splice over one where the shanks of the belts are snugly received in tightly formed holes with a circular cross-sectional shape.

With the distal ends of the bolts projecting through the holes, nuts are next placed on the projecting ends of the shanks and held thereon by starting the threading of the internal threads on the nut with the threads on the shank. This presents a significant limitation in the use of current bolt fasteners, since it is often very difficult for a worker to start the threading by hand as they are often performing splicing operations in extreme conditions such as where there is poor lighting and/or in extreme cold temperatures. In the latter case, the worker is often wearing gloves making it very difficult to have the necessary tactile coordination to start the thread properly. With current bolts, there is only a very small conical lead-in tip portion at the end of the bolt onto which the nut is placed. In this position, the nut can shift around so that it is at an angle to the axis of the bolt shank, and starting the threading in this angled orientation tends to produce cross-threading between the nut and shank. A nut that is cross-threaded makes it very difficult for the wrenching operation to properly seat the nut in the aperture of the upper plate as is desired for providing the fastener with its maximum holding power and the resultant strong splice. In addition, backing the nut off the shank to avoid screwing down the nut in its cross-threaded orientation on the bolt shank is also difficult and increases installation time.

Even where the nuts have been threaded properly to the shank, when a power wrench is employed to screw the nuts down for clamping the fastener plates against the belt end portion, vibrations associated with use of the power tool can cause the nuts to loosen and fall off the ends of the shanks requiring the nuts to be picked up and placed back thereon or having the worker retrieve additional nuts for placing on the shank end. Oftentimes, splicing is occurring at an elevated location and if the nuts fall to the ground below, the worker may not have a sufficient number of nuts at the elevated location for completing the splice without having to travel down to the ground level for obtaining additional nuts generating additional delays during the installation process.

It has also been found that during shipping and handling the endmost threads on the bolt shank can be damaged adding to the difficulty in threading nuts thereto. In addition, during the installation procedure, the plates may be pounded as with an impact tool to sink teeth thereof into the belt carcass. If the impact tool inadvertently contacts the projecting shank end, the threads most likely to be damaged are those at the end thereof creating the adverse consequences for starting the threading of the nut described above.

SUMMARY OF THE INVENTION

In accordance with the present invention, a fastener is provided for splicing end portions of conveyor belts together with the fastener having a bolt with a pilot or lead-in portion that provides improved threading of a nut thereto and makes installation of the fasteners on the belt ends faster and easier. The pilot of the bolt is longer than the beveled conical tip portion of prior belts so that nuts received thereon will stay substantially aligned with the axis of the shank. In this manner, threading of the nut to the bolt shank is easier in terms of avoiding cross-threading problems. Also, as the pilot portion of the shank is free of any threads, the installation of the bolt onto the belt ends can be done more quickly with less resistance during the insertion process. With the threading of the nuts started on the bolt shank threads, the nuts are less likely to fall off the piloted shank when a power wrench is used to screw the nuts down for clamping the plates of the fastener about the belt end as even if the nuts become unthreaded from the shank, the pilot portion will hold the nuts thereon.

In one form of the invention, the fastener includes a pair of plates each having at least one aperture extending therethrough, and a bolt including an elongate shank having opposite ends thereof. A plurality of threads are formed along the shank. A nut is provided having internal threads for being threaded to the shank threads with the shank projecting through a hole in one of the conveyor belt ends and through the aperture of each of the plates. A pilot portion of the shank is at one of the ends thereof and has a surface free of threads extending about the shank. The surface has a predetermined length along the shank to allow the nut to be readily fit onto the shank via the pilot portion thereof. With the nut on the pilot portion, threads of the nut are in a predetermined orientation to address the shank threads for properly threading the nut to the shank reducing instances of cross-threading thereof. This is in contrast to the beveled end tips of prior bolts which allow nuts to be shifted about when a worker starts to thread the bolt to the shank increasing the likelihood of cross-threading and the attendant problems therewith.

In one form, the shank has a longitudinal axis and the nut has an internal axis substantial aligned with the shank axis with the nut received on the pilot portion of the shank. Accordingly, the pilot portion maintains the nut axis substantial aligned with the nut axis so that the threads engage each other in the proper orientation to avoid cross-threading.

In another form, the shank pilot portion has a section that is cylindrical in shape with a predetermined diameter and the threads of the nut have a predetermined diameter. The diameter of the nut threads is greater than the diameter of the pilot surface by a predetermined amount so that the nut threads readily clear the pilot cylindrical surface when fit thereon. In this manner, the pilot portion guides the nut along the surface thereof before a worker is required to start the threading process between the nut and the shank. This makes installation easier especially given that the pilot also aligns the nut in the afore-described orientation where it addresses the shank threads to facilitate proper threading of the nut to the shank after it has been slid down the pilot portion to the shank threads.

In a preferred form, the nut has a body having an inner annular surface including the internal nut threads thereon and aligned about an internal axis of the nut, and the nut body has a predetermined thickness along the nut axis that is approximately equal to or less than the predetermined length of a pilot portion to keep the nut thereon during fastener application operations. Because the pilot portion is as long or longer than the nut, even if the nut works its way unthreaded from the shank, it is unlikely to fall off the pilot portion as it will still project to the level of or beyond the top of the nut in contrast to prior bolts where if the nut was to work its way unthreaded during fastener application operations, it would in all likelihood fall off the small conical tip at the end of the shank necessitating replacement of the nut slowing down the installation process.

In another form of the invention, a fastener is provided for splicing end portions of conveyor belts having tough, rugged carcasses in which holes are preformed through the end portions for receiving bolts therethrough. The fastener includes an elongate bolt shank having proximate and distal ends thereof and an axis along which the shank extends. An enlarged head portion is at the proximate end of the shank for being seated in the aperture of one of the plates. A plurality of threads are formed on the shank adjacent the head portion and extending toward the distal end of the shank. A non-threaded lead-in portion is provided at the distal end of the shank. The lead-in portion has a predetermined length from the distal end that is sized to guide the shank during insertion thereof through one of the preformed holes in the belt end portion minimizing the force required to push the shank through the hole. The long lead-in portion, starts the bolt as it is inserted through the through holes for the predetermined length of the lead-in portion before it hits any threads on the shank so the worker pushing the bolt through the belt end hole can more easily complete this process without experiencing hang-ups of the shank threads on the tough carcass material surrounding the hole.

In one form, the lead-in portion has a section that is cylindrical in shape with a predetermined diameter that is smaller than the diameter of the threads on the shank to lead and guide the shank for rapid insertion through the preformed hole for faster fastener application operations.

In another aspect of the invention, a method of splicing end portions of conveyor belts having tough, rugged carcasses is provided. The method includes fixing a template having holes therein to at least one of the end portions to be spliced, driving a sharp hole forming tool through a template hole and through the belt carcass, forming a tight hole through the belt end portion aligned with the template hole to minimize the amount of belt carcass material removed in forming the hole, providing a fastener having plates with apertures and at least one bolt having a shank with threads thereon, manually inserting a non-threaded lead-in portion of a bolt shank into the hole at one end thereof, advancing the shank through the tight hole with a minimum of hang-ups of the threads on the belt carcass about the hole, fitting an internally threaded nut on the lead-in portion projecting out from the other end of the hole, and threading the nut to the threads on the shank to clamp the fastener plates on opposite surfaces of the conveyor belt at the one end portion thereof to provide a high strength belt splice.

BRIEF DESCRIPTION OF THE DRAWINGS

FIG. 1 is a perspective view of a conveyor belt fastener in accordance with the invention showing a lower plate and a pair of bolts including elongated threaded shanks with pilot portions at the ends thereof;

FIG. 2 is a perspective view of a prior art conveyor belt fastener showing the different bolts thereof;

FIG. 3 is an exploded perspective view of the conveyor belt fastener off FIG. 1 showing a conveyor belt and through hole in phantom and a nut to be received on the pilot portion of the bolt shank and screwed down to an aperture of an upper plate of the fastener;

FIG. 12 is a perspective view showing the nuts being manually threaded onto the shank threads;

FIG. 13A is a sectional view through one of the belt fasteners showing the nuts on the pilot portion of the belt shank and partially threaded to the endmost shank threads with one of the bolts having the power wrench thereon;

FIG. 13B is an enlarged view of the nut on the bolt shank properly threaded thereto;

FIG. 14A is a sectional view of a prior conveyor belt fastener showing a nut at an angled orientation on a conical tip end of the bolt shank;

FIG. 14B is an enlarged sectional view of the bolt and nut of FIG. 14a showing the nut cross-threaded to the shank threads;

FIG. 15 is a perspective view showing application of a strip of tape between the plates and the joint formed between the belt ends;

FIG. 16 is a perspective view showing the use of a power wrench to tighten the nuts down into the apertures of the top plates;

DETAILED DESCRIPTION OF THE PREFERRED EMBODIMENT

Figure 20:
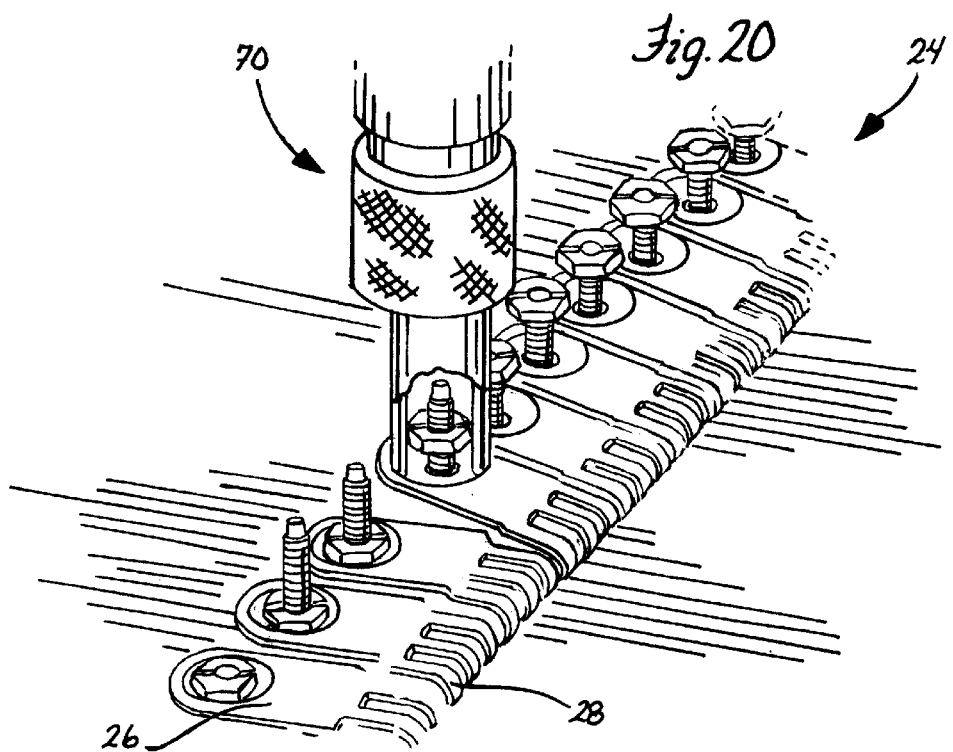
FIG. 20 is a perspective view of the bolts of the present invention used with a hinge fastener and a power wrench screwing nuts down along the bolt shanks.

In FIGS. 1 and 3, a fastener 10 for making conveyor belt splices is shown. The fastener 10 includes an lower plate 12 and an upper plate 14 which cooperate with bolts 16 to splice belt ends 18 and 20 together. As shown in FIG. 13 A, the plates 12 and 14 span the abutment joint 22 formed between the belt ends 18 and 20 and accordingly the depicted conveyor belt fastener 10 is termed a solid plate-type fastener. The bolts 16 of the present invention are also adapted to be used with hinge-type fasteners 24 (FIG. 20) which have an upper plate 26 and a lower plate (not shown) which are joined by arcuate hinge loops 28 with the fasteners being attached to a single belt end. Identical hinge fasteners 24 are attached on the other belt end and the loops 28 are mated for receiving a hinge pin (not shown) therethrough to provide a hinged joint between the belt ends. As stated, plates of such hinge-type fasteners 24 also use bolts 16 in accordance with the present invention for being readily secured to belt ends.

Returning to the description of the solid plate fasteners 10 and with reference to FIG. 3, the lower plates 12 include a pair of apertures 30 and 32, and the upper plates 14 likewise include a pair of apertures 34 and 36 so that with the plates 12 and 14 secured to the belt ends 18 and 20, each one of a pair of bolts 16 will extend through an aligned pair of apertures 30 and 34 and apertures 32 and 36 in the lower and upper plates 12 and 14, as well as through aligned through-holes 38 formed in the belt ends 18 and 20. To clamp the plates 12 and 14 on the belt ends 18 and 20, internally threaded nuts 40 are tightened down on the bolts 16 until seated in the upper plate apertures 34 and 36. The plate apertures 30, 32, 34 and 36 are preferably recessed so that with the fastener 10 secured to the belt ends 16 and 18, an enlarged head portion 42 of the bolts 16 will seat in the recess apertures 30 and 32 of the lower plate 12 with the nuts 40 at the other end of the bolt seating in the apertures 34 and 36.

The present bolts 16 have an elongate shank having a proximate end 46 and a distal end 48 with the shank extending along bolt axis 50. At the distal end 48 of the bolt shank 44, there is provided a lead-in or pilot portion 52 which is adapted to guide the nuts 40 thereon and start the threading thereof to the threads 54 with the risk of cross-threading being kept to a minimum.

The pilot portion 52 allows a worker to relatively easily place a nut 40 on the portion 56 of the bolts 16 including the pilot portion 52 projecting beyond the upper surfaces 18a and 20a of the respective belt ends 18 and 20 and top plate 14 and at least partially thread the nut 40 to the shank threads 54, as is shown in FIGS. 12 and 13A. This is in contrast to prior bolts 58 used in conveyor belt fasteners as can be seen in FIG. 2 where the distal end 60 of the bolt shank 59 is only provided with a small beveled or sharply angled conical tip end portion 62 before the threads 64 begin thereon. Referring to FIGS. 14A and 14B, because the axial length of the beveled end 62 is so small in comparison to the size of the body 43 of the nut 40, the end 62 does not adequately guide the nut 40 prior to it engaging the endmost threads 64a on the bolt shank 59 of the prior bolt 58 and requiring the worker to start threading the nut 40 thereon. This requires that the worker shift and jiggle the nut 40 about as they turn it to get it threaded onto the shank 59 as the tip end 62 provides little to no alignment and guiding function for this purpose. Depending on conditions and the skill and patience of the particular worker, the required manual alignment of the nut 40 so that the nut axis 41 is in substantial alignment with the shank axis 59a for proper threading on the shank 59 can cause the worker to drop the nut 40 creating undesirable inconveniences and time delays during installation. As shown in FIG. 14A, the small beveled tip 62 also allows the nut 40 to be tilted relative to the bolt shank 59 with their respective axes 41 and 59a skewed and can lead to cross-threading between the threads 68 of the nut 40 and the bolt shank threads 64, as illustrated in FIG. 14B.

By contrast, the present bolt pilot portion 52 is significantly longer in the axial direction than the beveled tip end 62 of prior bolts 58, as best seen in a comparison of FIGS. 13B and 14B. Accordingly, the pilot portion 52 allows a worker to place a nut 40 over the top of the bolt 16 so that the inner threaded annular surface 66 extending about axis 41 of the nut body 43 can be readily fit onto the pilot portion 52 without interference from the external threads 54 on the shank 44, and the worker can allow the nut 40 to slide down the pilot portion 52 such as until it travels down to the endmost thread 54a of the shank threads 54 and is stopped thereat. To this end, the diameter, d1, of the pilot portion 52 is less than the diameter, d2, across the crests 69 of the nut threads 68 by a predetermined amount to allow the nut 40 to readily be fit on the pilot portion 52. In this manner, the pilot portion 52 serves to locate the nut 40 onto the bolt shank 44 before it encounters the threads 54 thereof.

Once on the shank 44 by way of pilot portion 52 thereof, the nut 40 is also kept from tilting with its axis 41 substantially aligned with shank axis 50 so that its threads 68 are in predetermined orientation to address the shank threads 54 for properly threading the nut 40 to the shank 44, as shown in FIGS. 13A and 13B. In this regard, the predetermined clearance between the diameters d1 and d2 is also sufficiently small to limit tilting of the unit body 43 relative to the shank axis 50 which might otherwise increase the chances for cross-threading to occur.

With the nut 40 partially threaded to the bolt shank 44 as shown in FIG. 13A, the bolt pilot portion 52 serves to maintain the nut 40 on the bolt shank 44 during the fastener application operations. A power tool 70 is often used to tighten the manually threaded nuts down the shank 44 for seating in the upper plate apertures 34 and 36. This procedure can induce vibrations which tend to loosen the nut 40 from its prethreaded condition on the bolt shank 44. However, because of the provision of the relatively long pilot portion 52, the nut 40, even if loosened from the threads 54, will not fall off the end 48 of the shank 44. If this situation occurs with the prior bolts 58, the loosened nut 40 will fall off the shank end 60 as the small beveled tip 62 thereof will not keep the nut 40 thereon. As shown in FIGS. 13A and 13B, the nut body 43 has a predetermined axial thickness, t, that is preferably the same or smaller than the axial length of the pilot portion 52. In this manner, even if the nut 40 works its way unthreaded so that it loosely sits on the pilot portion 52, the nut body 43 and particularly the top surface 43a thereof will not project beyond the end 48 of the shank 44, or if it does the majority of the length of the nut annular threaded surface 66 will still be in confronting relation with the pilot portion 52 tending to keep the nut 40 on the shank 44 despite vibrations thereof.

Figure 9:
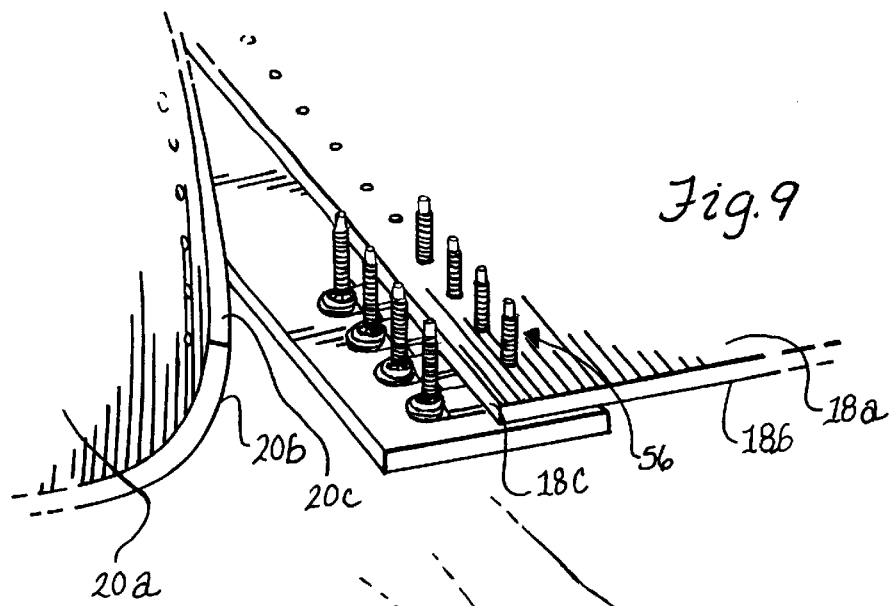
FIG. 9 is a perspective view showing the bolts inserted through the through holes in one of the belt ends with the other belt end folded back.

Prior to fastening the nuts 40 down the shanks 44 into the upper plate apertures 34 and 36, there is the matter of inserting the bolt shanks 44 into and through the through holes 38 formed in the belt ends 18 and 20 so that portions 56 including pilots 52 thereof project above the belt end upper surfaces 18a and 20a, as shown in FIG. 9. It has been found that the provision of the pilot or lead-in portion 52 greatly eases this procedure, particularly with well formed, tight through holes 38. With the prior bolts 58 shown in FIGS. 2, 14A and 14B, the threads 64 extended almost all the way to the distal end 60 of the shanks 59. As such, these endmost threads 64a tend to interfere with the belt carcass material about the through holes 38 and cause hang-ups as the worker tries to push the bolt shanks 59 therethrough. This causes interruptions and stopping of the bolt shank 59 as the threads 64 get hung up on the tough belt carcass about through hole 38 requiring that the bolt 58 be worked free to continue the insertion process. Although this is a problem even as individual bolts 58 are pushed through the holes 38 in the first belt end 18, the problem is exacerbated with the second belt end 20 as several bolts 58 at once are being inserted through several corresponding through holes 38 as the folded back belt end 20 is brought back forward over and onto the belt shanks 59, as shown being done with the present bolts 16 in FIGS. 9 and 10.

Figure 4:
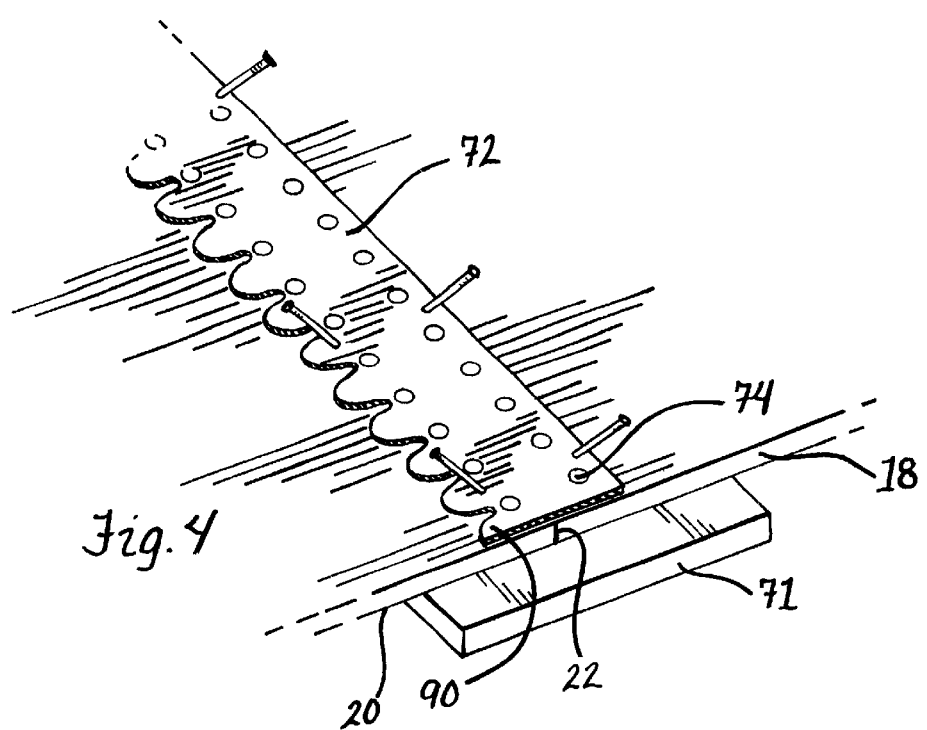
FIG. 4 is a perspective view of a template fixed to a pair of belt ends to be spliced.
Figure 5:
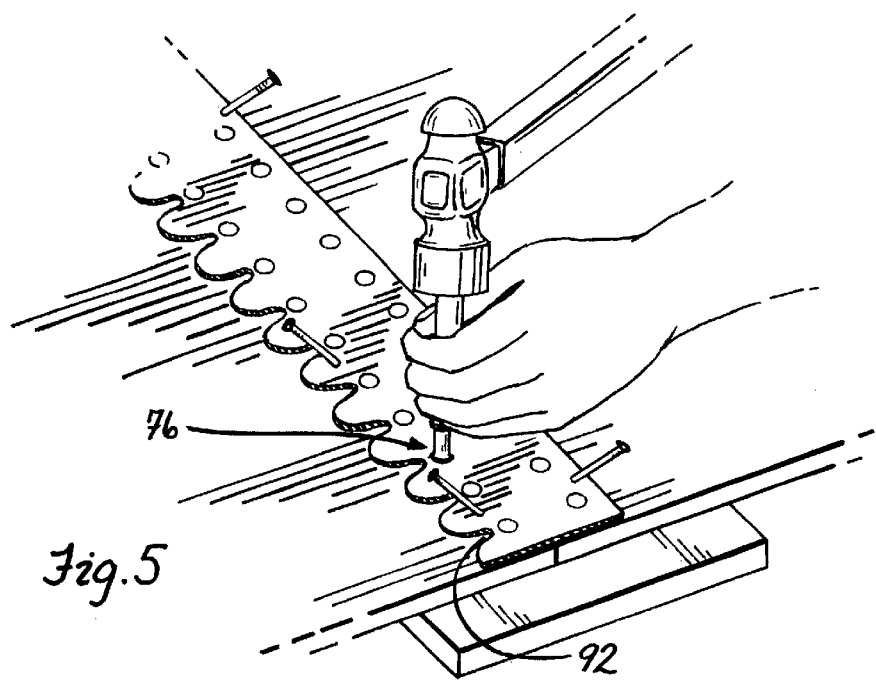
FIG. 5 is a perspective view of a through hole forming operation with a punch driven through guide holes in the template.
Figure 6:
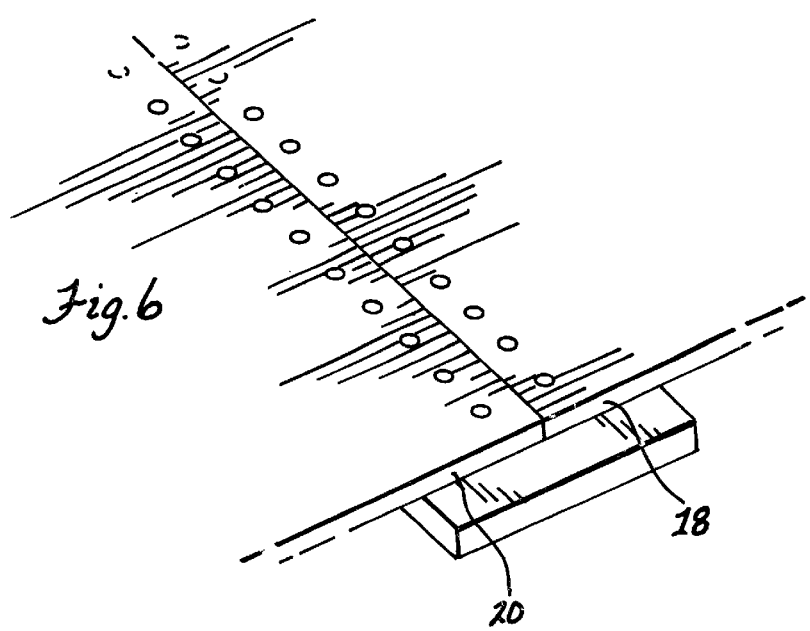
FIG. 6 is a perspective view of the belt ends with the template removed and having the preformed through holes therein.
Figure 7:
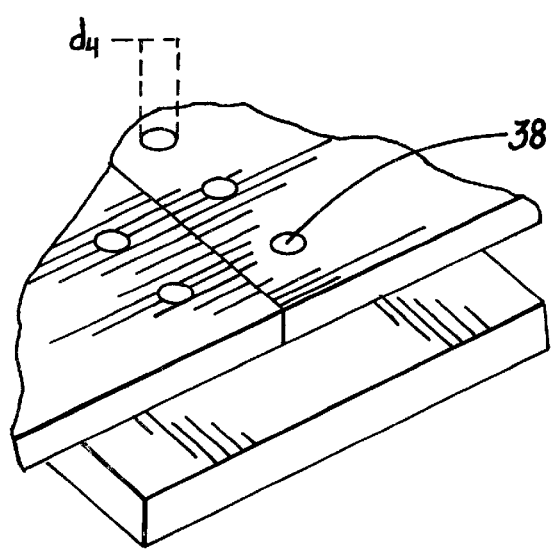
FIG. 7 is a fragmentary enlarged view of a portion of the belt ends of FIG. 6 showing the through holes with a circular, cross-sectional shape.
Figure 8:
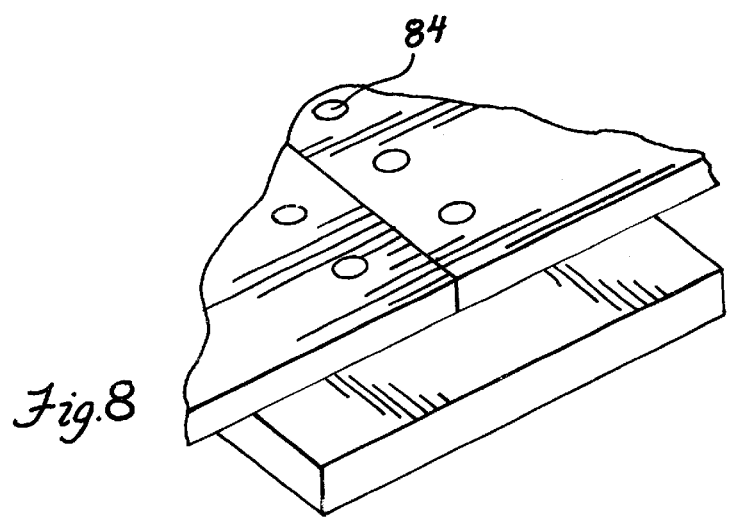
FIG. 8 is a view similar to FIG. 7 showing through holes deformed to an oversize, irregular cross-sectional shape.

The present bolts 16 including the lead-in portion 52 thereof significantly reduce instances of hang-up and the resistance created thereby as the bolt shank 44 is pushed through the through holes 38. Because the lead-in portion 52 is free of threads, it does not present any locations thereon for hanging-up on the carcass of the belt about the through holes 38 and, as such, it allows the worker to begin the insertion process without encountering the resistance threads at the end of the shank 44 might otherwise create. This in turn allows the remainder of the shank 44 having threads 54 thereon to also be inserted with less resistance as there will be some momentum built-up in the sliding of the shank 44 through the through hole 38 before any threads 54 have entered the through hole 38. Thus, unlike the prior bolts 58 which readily get hung-up so that the belt shank 59 stops and starts as it is being inserted requiring that it be worked through the through holes 38, the present bolts 16 will generally allow the shanks 44 to be fit through the through holes 38 in a substantially centered, continuous, uninterrupted motion. As is apparent, this is particularly valuable when the holes 38 are tightly formed as with a circular cross-sectional shape such as shown in FIGS. 6 and 7 where the clearance between the belt material about the through holes 38 and the threads 54 of the shank are at a minimum.

As is apparent, the length of the present bolt 16 including the lead-in portion 52 thereof has to be sufficient so that when inserted into through-holes 38 in the belt ends 18 and 20, the portion 56 of the bolt shank 44 projecting from the top surfaces 18a and 20a of the respective belt ends 18 and 20 and the top plate 14 thereon includes the full length of the lead-in portion 52 and the endmost threads 54a adjacent thereto so prethreading of the nut 40 can readily occur. Thus, the lead-in portion 52 can not be so long in comparison with the total length of the bolt 16 that it does not project fully over the top plate 14 and does not leave exposed endmost threads 54a, as described above. Where the bolts 16 are used with hinged fasteners 24, the upper plate 26 projects up at an incline from the plane of the lower plate effectively increasing the distance the bolts 16 must span over the thickness of the belt prior to tightening the nuts 40 thereon. Thus, it is important that the present bolts 16 have sufficient length to satisfy the above-noted requirements when they are to be used with hinged fasteners 24 which, in turn, insures that the bolts 16 can be employed with solid-plate fasteners 10 that are for use with approximately the same ranges of belt thicknesses.

Another advantage of the pilot portion 52 is that the endmost threads 54a on the shank 44 are spaced from the distal end 60 and thus are protected from impacts that it may receive such as during shipping and handling and during the fastener application process. In prior bolts 58, the endmost threads 64a are closely adjacent the distal end 60 of the shank 59 and are susceptible to being damaged by impacts received thereat. By contrast, the threads 54a are spaced sufficiently far from the shank distal end 48 so as to provide protection therefor. Because the threads 54a are less likely to be damaged by impacts against the distal end 48 of the shank 44, these undamaged threads 54a allow a worker to start threading the nut 40 onto the shank 44 without incurring problems occasioned by damaged threads such as seen with prior bolts 58.

Turning next to FIGS. 4–19 to more specifically describe the installation process, after the belt ends 18 and 20 have been squared off for splicing, the belt ends can be supported on a wood plank 71 with a template 72 fixed thereto as by nailing. The template 72 is provided with a series of guide holes 74 that are equally spaced and arranged in two rows along the length of the template 72 so that with the template 72 fixed to the belt ends 18 and 20 one row of guide holes will be on belt end 18 and the other row of guide holes will be on belt end 20 with both rows being equally spaced from the abutment joint 22 formed therebetween.

With the template 72 in place on the belt ends 18 and 20, the through holes 38 are formed in the belt end by manually driving a sharp hole forming tool 76 such as a punch or boring bit through the guide holes 74 and into the belt carcass therebelow. Alternatively, to save on installation time, a power or electric impact wrench can be used adapted for driving the punch or boring bit 76 through the belt carcass.

After the through holes 38 have all been formed, the templates 72 can be removed from the belt ends 18 and 20. As shown in FIG. 6, the belt ends 18 and 20 will have a series of precisely placed through holes 38 for forming a tight splice therebetween with the fasteners 10. It is preferred in forming the through holes 38 that a new or undamaged template 72 be utilized having guide holes 74 that are substantially circular in shape as this will tend to produce well formed, tight cylindrical through holes 38 underlying the guide holes 74. In this manner, the amount of space between the bore walls 38a and the bolt shank 44 will be kept to a minimum while still allowing the shank 44 to be inserted therethrough. This keeps more of belt carcass in place so that the splice formed with this fasteners 10 is not weakened such as if there was loose play between the shank 44 and bore walls 38a.

Referring again to FIG. 13B, the pertinent dimensions of the bolt shank 44, lead-in portion 52 and threads 54 thereof are shown. The lead-in portion 52 preferably has a cylindrical section 78 with a predetermined length, L, and a predetermined diameter, d1, thereof The cylindrical surface 78 is smooth and free of threads that can catch on the belt carcass during installation of shanks 44 in the through holes 38. The lead-in portion 52 has a distal beveled tip end section 86 and a proximate transition area 88 where the cylindrical wall 78 tapers out to the endmost thread 54a with the cylindrical surface 78 being between the beveled end 86 and transition area 88 along the shank 44. Other configurations for the lead-in portion 52 are also contemplated such as an entirely tapered configuration as long as the surface is substantially free of projections or threading.

The crests of the internal nut threads 68 have a minor diameter d2 which generally may equal the diameter of the roots of the shank threads 54 plus any tolerances depending on the degree of their mating fit and which, in the preferred form, is slightly larger than the diameter d1 of the lead-in portion 52, as can be seen in FIG. 13B. At their crests 82, the threads 54 have a predetermined major diameter, d3. By way of example and not limitation, the threads 54 can have a major diameter d3 with sizes of 0.2417 inch at a minimum tolerance and 0.2489 at the maximum tolerance and a pitch of 0.2181 inch at the minimum tolerance and 0.2218 inch at the maximum tolerance. Similarly, exemplary sizes for the bolts 16 include a total axial length of 1.698 inches which includes the head 42 and the shank 44. The axial length of the lead-in portion 52 less the transition area 88 can be approximately 0.180 inch that includes the length of the beveled end 86 which can be approximately 0.040 inch. Accordingly, with the above sizes, the length L can be approximately 0.140 inch. The diameter d1 of the cylindrical section 78 can be approximately 0.190 inch. The angle of the bevel at the end 86 can be approximately 20° relative to axis 50.

The above sizes are those of one bolt 16 made in accordance with the invention and for use with fasteners 110 and 24 that are designed for conveyor belts having specified ranges of thicknesses. Accordingly, the sizes for the bolts 16 can vary as different fasteners 10 and 24 are employed on thicker or thinner belts. For instance, the above sizes for the bolt 16 are for a ¼' bolt that is for use with solid plate fasteners 10 designed for application to belts having thicknesses in the range of approximately 3/16 inches to 9/16 inches, and with hinged fasteners 24 designed for application to belts having thicknesses in the range of approximately ¼ inches to ⅝ inches. The nut 40 for use with the above-specified ¼' bolt is designated as a ¼-24 nut with the numeral 24 indicating the number of threads 68 per inch. The body 43 of the above-designated nut 40 preferably has a thickness, t, of approximately 0.250 inches.

Returning to FIG. 7, well-formed through holes 38 having a circular cross-sectional shape are depicted with a predetermined diameter of d4. To provide a strong splice, the diameter d4 is preferably only slightly larger than the major diameter d3 at the crests 82 of the bolt threads 54. What can tend to occur in the field is that over time the template holes 74 can become ragged and deformed from their original circular shape as by repeated engagement of the edges about the hole with the tool 76 being driven therethrough as workers make mistakes such as by not centering the tool over the holes 74 or by use of less precise tool 76 such as a boring bit. Accordingly, this can produce through holes 84 in the belt ends 18 and 20 having a shape that is other than the desired tight circular shape such as with the oval shape shown in FIG. 8.

These larger oval cross-sectional shape holes 84 despite removing a greater amount of belt carcass material from the belt ends 18 and 20 is not necessarily viewed as a problem by field workers since this allows them to more easily and readily insert bolts 58 therethrough as there is more clearance between the bolt threads 64 and the hole walls about the larger, deformed or oval holes. Although this may reduce installation time due to reduced instances of hang-ups of the belt material on the bolt threads 64, it will generally produce a weaker splice due to lower belt integrity as a greater amount of the carcass is punched out therefrom and there is more play between the shank 59 and walls about the deformed through holes 84.

With the present bolts 16 where interference and hang-ups are not as significant of a concern, workers will be more inclined to properly form the through holes so that they have a tight, circular cross-sectional configuration as even with a minimum amount of clearance between the holes walls 38a and the bolt shank 44, the bolt lead-in portion 52 allows the bolt shanks 44 to be inserted therethrough without causing the worker to expend significant time and effort in working the bolt shank 44 through the hole 38. Thus, the present bolts 16 encourage workers to create splices that have their maximum strength with tightly formed circular through holes 38 where the clearance between the shank thread diameter d3 and the circular hole diameter d4 is kept to a minimum.

After the through holes 38 have been formed with their tight, circular cross-sectional configuration and the template 72 has been removed from the belt ends 18 and 20, the bolts 16 are next inserted through the through holes 38. Referring to FIG. 9, first the belt end 18 is bent back to allow access to individual ones of the through holes 38 so that individual bolts 16 can be inserted. Then, one of the bolts 16 on one of the fasteners 10 will be inserted into a particular through hole 38 so that its pilot portion 52 first enters the through hole 38 via the bottom surface 18b of the belt 18 with the pilot portion 52 allowing the bolt shank 44 to be inserted in a relatively quick and easy manner without encountering significant resistance during this process until the shank portion 56 is projecting over the belts upper surface 18a. This process is repeated until the bolts 16 have been inserted through all of the holes 38 formed in the belt end 18.

Figure 10:
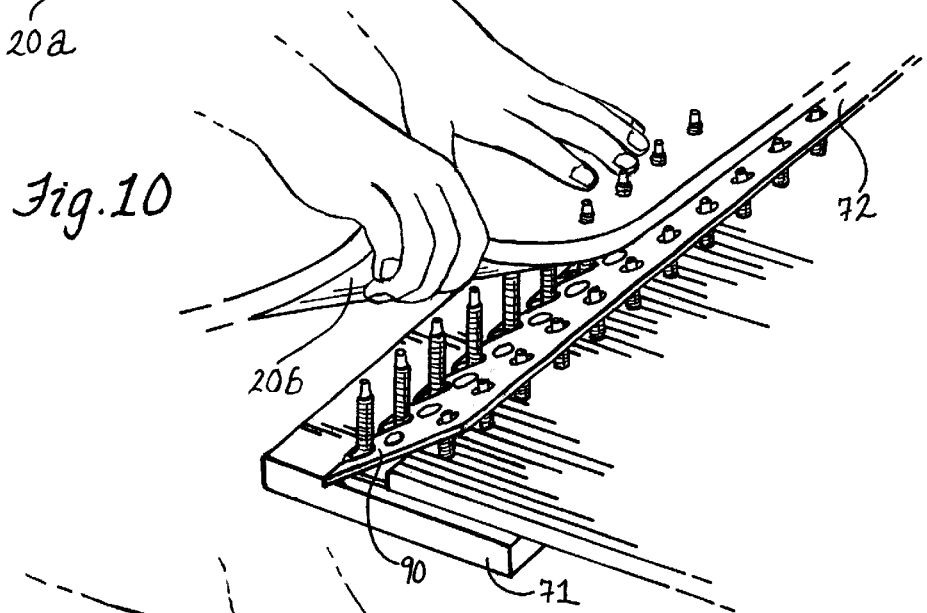
FIG. 10 is a perspective view of the belt ends and fasteners showing a comb edge of the template used to align the bolts to be inserted in the through holes of the second belt end and the second belt end being pushed down over the aligned bolts.

As can be seen in FIG. 9, after one of the bolts 16 on each of the fasteners 10 has been inserted through the through holes 38 in the belt end 18, the other bolt 16 on the two-bolt fasteners 10 will be disposed beyond the end edge 18c of the belt 18. With the belt end 20 folded back these exposed bolts 16 are next inserted into through holes 38 on the belt end 20. For this operation, the template 72 is provided with a comb edge 90 that has pockets 92 aligned with the guide holes 74. Referring to FIG. 10, the template 72 is placed so that the back row of guide holes 74 has the bolt projecting portions 56 above the first belt end 18 extending therethrough with the template 72 angled downwardly with the comb edge 90 reaching the exposed bolts 16 disposed beyond the belt end edge 18c so that they are received in the template pockets 92. As earlier discussed, this assists in keeping the exposed bolts 16 from shifting about as the belt end 20 is placed thereon.

With the exposed bolts 16 being generally confined against shifting in the template pockets 92, the belt end surface 20b is pushed down onto the distal ends 38 of the bolt shanks 44 until all of the shanks 44 are fit in respective ones of the through holes 38 in the belt end 20. This procedure is made significantly easier by way of the pilot portion 52 on the bolt 16, as previously described. Thereafter, the template 72 is removed and the belt end 20 is pushed all the way down toward the support 71 so that each bolt 16 of the fasteners 10 is inserted through through holes 38 in the belt ends 18 and 20 with portions 56 projecting above the respective top surfaces 18a and 20a thereof. The pushing down of the belt end 20 over the exposed bolts 16 will also bring the belt end edge 20c into abutment with belt end edge 18c for forming joint 22 therebetween.

The centers of the through holes 38 formed in the opposing belt ends 18 and 20 are preferably spaced at a distance that is greater than the distance between the pair of apertures 30 and 32 in the lower plate 12. The bolts 16 are preassembled to the lower plate 12 so that the heads 42 thereof seat in respective apertures 30 and 32 and are prevented from rotation therein. More particularly, the recesses 30 and 32 are formed by semi-conical recess wall portions 94 and 96 including opposed channels 98 formed therebetween. These walls 94 and 96 are formed by being bent out from the plane of the lower plate 12 so that the channels 96 and 98 leave non-deflected portions of the lower plate 12 which define a pair of projections 102 and 104 extending radially into the recesses 30 and 32.

The heads 32 of the bolts have a tapered underside surface 106, and the conical wall portions 94 and 96 cooperate to define a conical seat for the bolt head surfaces 106 received thereon. The bolt heads 42 also have opposing notches or grooves 108 and 110 which receive the respective projections 102 and 104 of the lower plate 12 to provide anti-rotational engagement of the bolts 16 with the lower plate 12 when the bolt heads 14 seat in the apertures 30 and 32.

Figure 11:
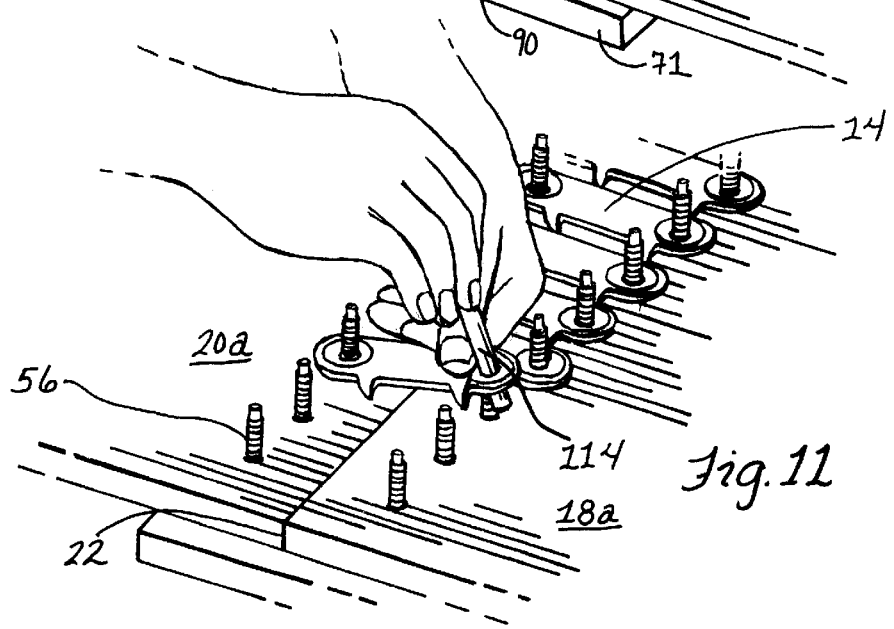
FIG. 11 shows application of the top plates over the projecting ends of the bolts.

To keep the bolts 16 preassembled to the lower plate 12, washers 112 as disclosed in applicant's assignee's U.S. Pat. No. 5,599,131 are disposed on the bolt shanks 44. As can be seen in FIG. 1, the washers 112 abut against the semi-conical wall portions 94 and 96 to prevent the bolts 16 from sliding and keeping the lower plate projections 102 and 104 in non-rotational engagement in the bolt head notches 108 and 110. As described in the '131 patent, the washers 112 are disposed on the shanks 44 by a tolerance fit at a position sufficiently spaced from the lower plate 12, to allow outward swinging of the bolts 16 with the projections 102 and 104 staying registered in the notches 108 and 110 to keep the bolt heads 42 from rotating in the apertures 30 and 32. Because of the greater spacing between the through holes 38 relative to the lower plate apertures, the bolts 16 in a respective fastener 10 will be swung outwardly so that they can be fit into through holes 38 of opposing belt ends 18 and 20, as shown in FIG. 11. Accordingly, to place an upper plate 14 on the outwardly swung bolts 16, and in particular the projecting portions 56 thereof, the projecting portion 56 of one of the bolts 16 of the fastener 10 is placed in one of the apertures 34 and 36, and to fit the projecting portion 56 of the other bolt 16 of the fastener 10, a belt horn tool 114 is utilized to urge the bolt shank 44 for fitting into the other one of the upper plate aperture 34 and 36. In this manner, the bolts 16 of the individual fasteners 10 are forced together from their outwardly angled positions for being inserted through through holes 38 of the opposing belt ends 18 and 20 to a generally parallel position relative to each other which forces the adjacent belt end edges 18c and 20c into tight abutment with each other at the abutment joint 22 therebetween.

With the upper plates 14 in place over the bolt shanks 44 using the bolt horn 114, the nuts 40 can next be manually threaded to the shank threads 54, as shown in FIG. 12. Again, because of the lead-in or pilot portion 52, this operation is greatly facilitated as the portion 52 guides the nut 40 so that a worker can easily locate it for placement on the bolt shank 44 allowing them to basically "drop" the nut 40 onto the shank pilot portion 52. The nut 40 will slide down the cylindrical section 78 of the pilot portion 52 and come to rest at the transition area 88 adjacent the endmost thread 54a on the shank 44. In this position, the nut 40 has its axis 41 substantially aligned with the shank axis 50 so that a worker merely needs to start turning the nut body 43 for proper threading of the nut threads 68 to the shank threads 54. Thus, the pilot portion 52 serves to align the nut body 43 relative to the shank 44 so that its threads 68 are in a predetermined orientation relative to the shank threads 54 that facilitates proper threading therebetween and minimizes the chance that cross-threading might occur.

Prior to tightening the nuts 40, a strip of a rigid, nylon-strip of tape 116 can be wrapped around joint 22 between the belt surfaces 18a and 20a and the fastener plates 12 and 14, as shown in FIG. 15. The tape 116 minimizes belt ripple on plied or solid woven belting and also seals the belt ends 18 and 20 against seepage of fines and moisture through the abutment joint 22 therebetween. Minimizing belt ripple is desirable as it permits splices to roll smoothly over pulleys and under belt scrapers to assure even belt tension and uniform wear across the splice.

Figure 17:
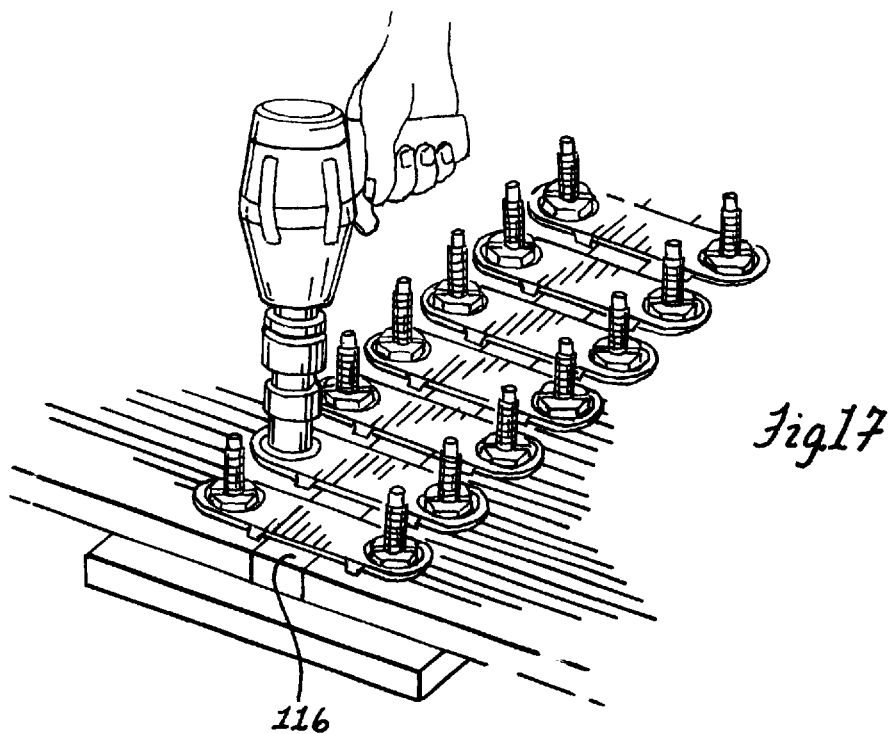
FIG. 17 is a perspective view showing operation of the power wrench to complete threading of the nuts on the second belt end.

FIG. 16 depicts a worker setting the tape 116 in place by pulling on an end 116a thereof and tightening the nuts 40 on the bolts 16 of one of the endmost fasteners 10a with a power wrench 70. After the endmost fasteners 10a on either side of the splice have been tightened, the exposed end of the tape 116 can be cut off and the prethreaded nuts 40 on the remainder of the bolt shanks 44 can be tightened from the endmost fasteners 10a toward the center fasteners in the middle of the belt ends 18 and 20, as shown in FIG. 17. As the nuts 40 are tightened, this draws the lower and upper fastener plates 12 and 14 together to clamp about the belt ends 18 and 20 and to sink teeth 120 on the plates 12 and 14 into the belt carcass. The shank pilot portion 52 also provides advantages during this process especially where the power wrench 70 is utilized as the vibrations caused by its operation will not cause the nuts 40 to fall off the distal ends 48 of the shanks 44. As previously described, even if the nuts 40 work themselves free from their prethreaded condition, the pilot portion 52 will hold the nuts 40 thereon even as the shank 44 is being vibrated.

Figure 18:
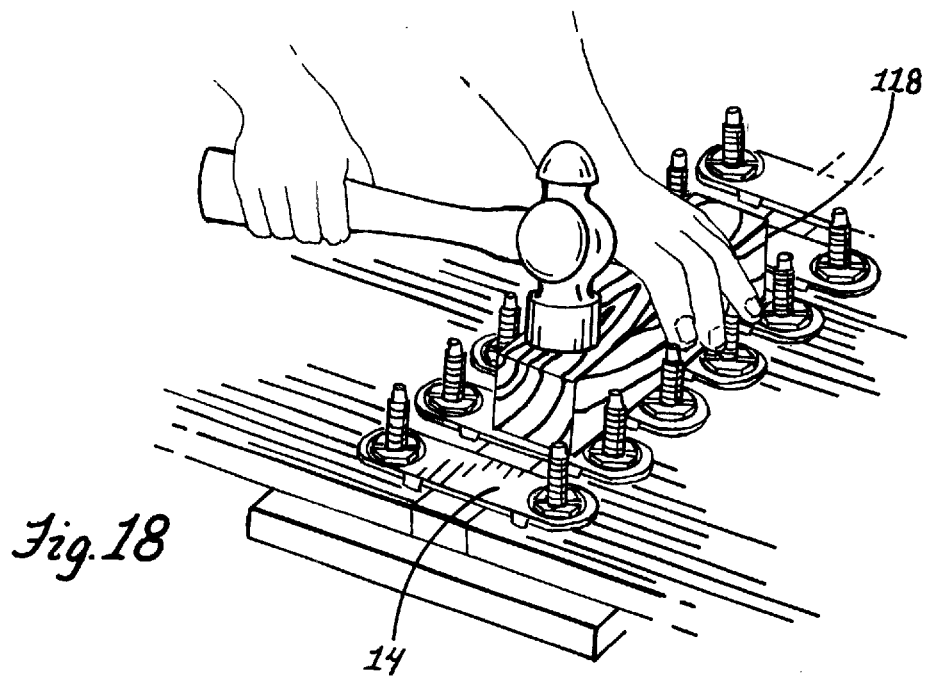
FIG. 18 is a perspective view showing the fastener upper plates being hammered down onto the upper surfaces of the belt ends.
Figure 19:
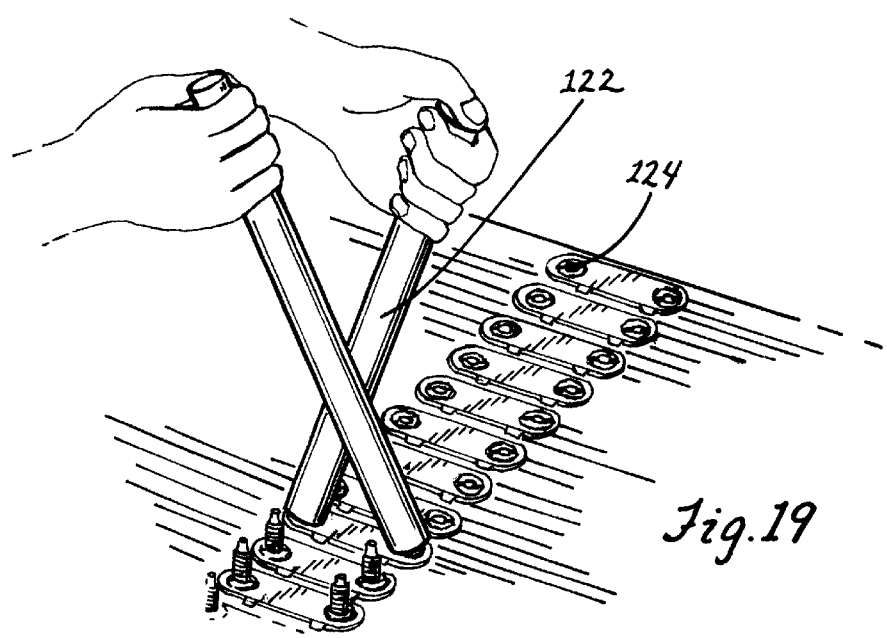
FIG. 19 is a perspective view showing the use of bolt breakers to snap off the projecting portions of the bolt shanks after the nuts have been fully tightened down in the aperture of the upper plates.

FIG. 18 shows a hammer block 118 being placed over the top plates and being impacted to ensure that the teeth 120 provided on the fastener plates are sunk fully into the carcass of the belt ends 18 and 20. The nuts 40 can be retightened after the hammering shown in FIG. 18. Finally, the excess portions including the pilot portion 52 of the bolt shanks 44 are broken off using bolt breaker tools 122, as shown in FIG. 19. The ends 124 of the broken off shanks can then be peened or ground to a smooth finish to finish the splicing operation.

It has been found that the provision of the present belt pilot portion 52 has saved approximately 15 to 20 minutes in installation time on belt ends having widths of 30 to 48 inches. The bolt shanks 44 can be inserted into and through the through holes 38 and the nuts 40 can be placed on the projecting portions 56 and properly threaded to the shanks 44 more quickly, and there is less of a chance of the prethreaded nuts 40 falling off the shanks 44 as other nuts 40 are being tightened. Further, the endmost shank threads 54a are protected from damage so that bolts 16 that have already been inserted into through holes 38 will not have to be replaced on account of thread damage avoiding the consequent time delays caused thereby.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A fastener for splicing ends of conveyor belts having opposite upper and lower surfaces thereof, the fastener comprising:

an upper plate and a lower plate for being associated with the respective opposite upper and lower surfaces of the belt prior for attachment thereto, and each plate having at least one aperture extending therethrough;

a bolt including an elongate shank having a predetermined length extending between opposite ends thereof for being inserted through a hole in the conveyor belt end and through the aperture of each of the plates;

a plurality of threads formed along the shank;

a nut having internal threads for being threaded to the shank threads;

a pilot portion of the shank at one of the ends thereof having a surface free of threads extending about the shank with the surface having a predetermined length along the shank to allow the nut to be readily fit onto the shank via the pilot portion thereof and so that the threads of the nut on the pilot portion are in a predetermined orientation to address the shank threads for properly threading the nut to the shank reducing instances of cross-threading thereof; and a projecting portion of the bolt shank including both the pilot portion and upper threads of the shank adjacent the pilot portion, the projecting portion being sized relative to the predetermined shank length to allow the projecting portion to extend beyond the upper plate associated with the upper belt surface to expose said upper threads of the projecting portion above the upper plate for prethreading the nut thereto prior to full securement of the plates to the belt end.

2. The fastener of claim 1 wherein the shank has a longitudinal axis and the nut has an internal axis substantially aligned with the shank axis with the nut received on the pilot portion of the shank.

3. The fastener of claim 1 wherein the surface of the shank pilot portion has a section that is cylindrical in shape with a predetermined diameter and the threads of the nut have a predetermined diameter that is greater than the pilot surface diameter by a predetermined amount so that the nut threads readily clear the pilot cylindrical surface when fit thereon.

4. The fastener of claim 1 wherein the bolt includes an enlarged head portion at the other end of the shank and the threads extend from the head portion to the upper threads adjacent the pilot portion of the shank and spaced from the one end of the shank to provide the upper threads with protection from damage.

5. The fastener of claim 1 wherein the nut includes a body having an inner annular surface including the internal nut threads thereon and aligned about an internal axis of the nut, and the nut body has a predetermined thickness along the nut axis that is approximately equal to or less than the predetermined length of the pilot portion to keep the nut thereon during fastener application operations.

6. The fastener of claim 1 wherein the pilot portion has a predetermined diameter smaller than the diameter of the threads on the shank to lead and guide the bolt during insertion through preformed holes in the belt end.

7. The fastener of claim 1 wherein the plates each include a pair of apertures, and the bolt includes a pair of bolts for projecting through the apertures of the plates.

8. The fastener of claim 1 wherein the plates include separate upper and lower plates or the plates include an arcuate hinge loop portion interconnecting the plates for receiving a hinge pin through loops of adjacent fasteners secured to the belt end, the upper plate projecting up at an incline relative to the lower plate with the bolt shank and projecting portion sized for exposing the upper threads adjacent the pilot portion above the upper plate of either the separate or hinged plates.

9. The fastener of claim 1 wherein the bolt includes an enlarged head portion at the other end of the shank, one of the plates includes at least one anti-rotation projection extending into the aperture, and the bolt head portion includes at least one notch therein for mating with the one projection with the bolt head portion seated in the one plate aperture to prevent rotation of the bolt head portion as the nut is threaded onto the shank.

10. A fastener for splicing end portions of conveyor belts having tough, rugged carcasses in which holes are preformed through the end portions for receiving bolts therethrough, the fastener including plates with apertures and cooperating with the bolt to clamp the plates on opposite surfaces of at least one of the end portions to be spliced, the fastener comprising:

an elongate shank of the bolt having proximate and distal ends thereof and an axis along which the shank extends;

an enlarged head portion at the proximate end of the shank for being seated in the aperture of one of the plates with the one plate and the bolt head resting on a support to orient the shank with its axis generally extending normal to the one plate;

a plurality of threads having a predetermined maximum diameter formed on the shank adjacent the head portion and extending toward the distal end of the shank;

a non-threaded lead-in portion at the distal end of the shank having a predetermined diameter less than the shank threads maximum diameter and a predetermined length from the distal end that allows the preformed hole in a belt end portion to be pushed over the shank from thereabove with a minimum of hang-ups on the shank threads;

a nut having internal threads having a predetermined minimum diameter less than the shank threads maximum diameter and greater than the lead-in portion diameter for being threaded to the shank threads; and a transition area of the shank projecting portion between the lead-in portion and said upper threads and being sized relative to the nut threads minimum diameter so that with the nut released on the lead-in portion, the nut will slide axially down the shank along the predetermined length of the lead-in portion until a lower leading thread thereof abuts against the shank at the transition area thereof to define a nut resting location along the shank with the nut in position for proper threading onto the shank threads.

11. The fastener of claim 10 wherein the lead-in portion has a section that is cylindrical in shape with a predetermined diameter smaller than the diameter of the threads on the shank to lead and guide the shank for rapid insertion through the preformed hole for faster fastener application operations.

12. The fastener of claim 10 wherein the nut has a body including an inner annular surface with the nut threads formed thereon for being threaded to the shank threads, the nut having an internal nut axis about which the annular surface is aligned with the nut body having a predetermined thickness along the nut axis that is approximately equal to or less than the predetermined length of the lead-in portion to keep the nut thereon during fastener application operations.

13. The fastener of claim 12 wherein the nut axis is maintained substantially aligned with the shank axis with the nut received on the lead-in portion to keep the nut threads from being cross-threaded to shank threads when the nut is threaded to the shank.

14. The fastener of claim 10 wherein the transition area includes an endmost upper thread of the shank threads at which the nut is stopped at the nut resting location along the shank.

15. A conveyor belt splicing assembly for splicing belt end portions together; the splicing assembly comprising:

a plurality of bolts each having an elongate shank with an enlarged head at one end thereof;

a plurality of threads formed along each of the shanks of the bolts;

upper and lower plates for being placed on opposite surfaces of a belt end portion, each of the plates having an aperture for receiving the bolt shanks therethrough with the bolt heads seating in the lower plate apertures;

a projecting portion of each of the bolt shanks having a pilot portion free of threads and including the upper shank threads of the shank threads distal from the bolt head and immediately adjacent to the pilot portion, the projecting portion being sized for exposing the upper threads with the shank extending through the plate apertures and a preformed hole in the belt end; and a plurality of nuts having internal threads sized to provide clearance between the nut threads and the pilot portion and to be threaded to the shank threads, the nuts having a stopped state prior to prethreading thereof where sliding of the nuts along the pilot portion is arrested via a leading thread of the nut abutting an uppermost thread of the bolt shank in proper alignment for being threaded thereto that allows a splice installer to rapidly turn all of the stopped nuts to quickly generate a plurality of prethreaded nuts on the exposed upper threads of the projecting portions of the bolt shanks.

16. The splicing assembly of claim 15 wherein the pilot portion is of a predetermined length and the nut has a predetermined thickness which are sized relative to each other to maintain the prethreaded nuts on the bolt shanks during a vibration inducing power application operation for tightening one of the nuts down onto the upper plate.

17. The splicing assembly of claim 16 where the pilot portion predetermined length is greater than the nut predetermined thickness.

18. The splicing assembly of claim 15 wherein the upper and lower plates are separate from each other and are sized to span across a joint between belt end portions to be spliced together with each of the plates including a pair of apertures for receiving a pair of bolt shanks therethrough with corresponding projecting portions thereof to allow nuts to be slid to their stopped state on bolts associated with both belt end portions.

19. A conveyor belt splicing system for splicing end portions of conveyor belts together and creating high strength splices therebetween, the splicing system comprising:

a pair of plates for being attached on opposite surfaces of the belts end portion, the pair of plates each including at least one aperture therein;

a bolt having an elongate shank for being inserted through a preformed hole in a conveyor belt end portion, the bolt having an enlarged head at one end thereof for seating in the aperture of one of the plates;

a plurality of threads on the shank having a predetermined maximum diameter;

a lead-in portion of the shank having a surface free of threads spaced from the bolt head and extending toward the end of the bolt opposite to the bolt head end with the shank threads disposed between the lead-in portion and the bolt head, the lead-in portion having a predetermined diameter that is less than the shank threads predetermined maximum diameter to guide the shank during insertion through the belt end portion preformed hole minimizing the force required to push the shank therethrough;

a nut having internal threads for being threaded to the shank threads;

a template and a hole forming tool, the template having at least one guide hole having a predetermined diameter that is minimized in size relative to the predetermined maximum diameter of the shank threads and the tool being sized to fit through the template guide hole for creating the preformed hole sized substantially the same as the guide hole to keep the amount of belt material removed by the tool and clearance between the shank threads and the belt material about the preformed hole to a minimum for providing high strength belt splices.

20. The splicing system of claim 19 wherein the shank includes a projecting portion including both the pilot portion and upper threads of the shank threads adjacent to the pilot position with the shank and projecting portion being sized relative to each other for exposing the projecting portion including the upper threads thereof beyond the other one of the plates with the shank inserted through the belt pre formed hole to allow the nut to be prethreaded thereto.

21. The splicing system of claim 19 wherein the shank includes a transition area between the shank threads and the pilot portion with the transition area located at a predetermined position along the shank for projecting beyond the other one of the plates with the shank inserted through the belt preformed hole and being sized relative to the nut threads to provide a stop for the nut prior to prespeading thereof.

* * * * *